(12) United States Patent
Zaplana (10) Patent No.: US 10,790,754 B2
(45) Date of Patent: Sep. 29, 2020

(54) SYSTEMS AND METHODS FOR TRANSFERRING POWER ACROSS AN ISOLATION BARRIER USING AN ACTIVE RESONATOR

(71) Applicant: Analog Devices International Unlimited Company, Limerick (IE)

(72) Inventor: Ricardo Zaplana, Limerick (IE)

(73) Assignee: Analog Devices International Unlimited Company, Limerick (IE)

(*) Notice: Subject to any disclaimer, the term of this patent is extended or adjusted under 35 U.S.C. 154(b) by 22 days.

(21) Appl. No.: 16/286,283

(22) Filed: Feb. 26, 2019

(65) Prior Publication Data

US 2020/0274455 A1    Aug. 27, 2020

(51) Int. Cl.
*H02M 3/335* (2006.01)

(52) U.S. Cl.
CPC ............................. *H02M 3/33584* (2013.01)

(58) Field of Classification Search
CPC .... H02M 3/335; H02M 3/00; H02M 3/33592; H02M 3/33546; H02M 3/33584; H02M 3/33569; H02M 3/5576; H02M 3/33507; H02M 3/156; H02M 3/1582; H02M 3/155; H02M 3/158; H02M 3/07; H02M 1/00; H02M 1/4255; H02M 1/08; H02M 7/12; H02M 7/48; H02M 2001/0009; H02M 2001/0006
USPC ...................................... 363/126, 21.06, 127
See application file for complete search history.

(56) References Cited

U.S. PATENT DOCUMENTS

| | | | |
|---|---|---|---|
| 4,953,068 A | 8/1990 | Henze | |
| 5,781,419 A | 7/1998 | Kutkut et al. | |
| 5,870,299 A | 2/1999 | Rozman | |
| 5,907,481 A * | 5/1999 | Svardsjo | H02M 3/33592 363/25 |
| 5,991,167 A * | 11/1999 | Van Lerberghe | H02J 7/022 363/127 |

(Continued)

FOREIGN PATENT DOCUMENTS

| CN | 1182649 C | 12/2004 |
|---|---|---|
| CN | 101378232 A | 3/2009 |

(Continued)

OTHER PUBLICATIONS

US 7,630,213 B2, 12/2009, Chen et al. (withdrawn)

(Continued)

*Primary Examiner* — Thienvu V Tran
*Assistant Examiner* — Nusrat Quddus
(74) *Attorney, Agent, or Firm* — Wolf, Greenfield & Sacks, P.C.

(57) ABSTRACT

Systems and methods for transferring power across an isolation barrier using an active self-synchronized resonator are described. A resonator may use the isolation barrier to resonate with active devices arranged on both sides of the barrier, to provide DC to DC power conversion with high efficiency. Furthermore, by using a microfabricated transformer or microfabricated capacitor as an isolator, the entire resonator may be microfabricated and implemented on chip. The resonator is also bidirectional, allowing power transfer in either direction across the isolation barrier.

20 Claims, 5 Drawing Sheets

(56) References Cited

U.S. PATENT DOCUMENTS

| | | | |
|---|---|---|---|
| 6,038,148 A * | 3/2000 | Farrington | H02M 1/38 |
| | | | 363/127 |
| 6,069,799 A | 5/2000 | Bowman et al. | |
| 6,104,623 A | 8/2000 | Rozman | |
| 6,130,828 A | 10/2000 | Rozman | |
| 6,256,214 B1 | 7/2001 | Farrington et al. | |
| 6,288,920 B1 | 9/2001 | Jacobs et al. | |
| 6,538,905 B2 | 5/2003 | Greenfeld et al. | |
| 6,819,574 B2 | 11/2004 | Xu et al. | |
| 6,944,033 B1 | 9/2005 | Xu et al. | |
| 7,489,526 B2 | 2/2009 | Chen et al. | |
| 7,548,440 B2 | 6/2009 | Chen et al. | |
| 7,558,080 B2 | 7/2009 | Chen et al. | |
| 7,613,016 B2 | 11/2009 | Chen et al. | |
| 7,706,154 B2 | 4/2010 | Chen et al. | |
| 7,983,059 B2 | 7/2011 | Chen | |
| 8,797,773 B2 | 8/2014 | George | |
| 10,068,702 B2 | 9/2018 | Posat et al. | |
| 2006/0109698 A1* | 5/2006 | Qu | H02M 3/33592 |
| | | | 363/127 |
| 2011/0199012 A1* | 8/2011 | Lai | H05B 41/282 |
| | | | 315/219 |
| 2013/0062962 A1* | 3/2013 | Xue | H02J 5/005 |
| | | | 307/104 |
| 2018/0278169 A1* | 9/2018 | Jitaru | H02M 3/33592 |
| 2018/0316388 A1* | 11/2018 | Lee | H04B 5/02 |

FOREIGN PATENT DOCUMENTS

| | | |
|---|---|---|
| CN | 101488715 A | 7/2009 |
| CN | 102064702 A | 5/2011 |
| CN | 102201739 A | 9/2011 |
| CN | 102801327 A | 11/2012 |
| WO | WO 01/52394 A2 | 7/2001 |
| WO | WO 2008/041399 A2 | 4/2008 |

OTHER PUBLICATIONS

[No Author Listed], Implementing a Digital AC/DC Switched-Mode Power Supply using a 56F8300 Digital Signal Controller. Freescale Semiconductor. Application Note AN3115. 2005; 24 pages.

[No Author Listed], Phase-Shifted Full Bridge DC/DC Power Converter Design Guide. Texas Instruments. TIDU248. May 2014; 56 pages.

[No Author Listed], Synchronous Phase Modulated Full-Bridge Controller. Linear Technology. LTC1922-1. 2000; 24 pages.

[No Author Listed], ZVS DC/DC Power Supply with Synchronous Rectifiers Evaluation Board. Renesas User's Manual. ISL6752/54EVAL1Z. May 25, 2018; 33 pages.

Liu et al., The Implementation of A Full-Bridge Phase-Shifted Zero-Voltage-Switching Power Converter. PEDS2009. IEEE. Nov. 2-5, 2009; 1173-1177.

Panov et al., Design and Performance Evaluation of Low-Voltage/High-Current DC/DC On-Board Modules. IEEE Transactions on Power Electronics. Jan. 2001; 16(1):26-33.

Rao et al., How to achieve low radiated emissions with fully integrated data and power isolation. EDN Network. Mar. 22, 2017; 14 pages.

Sterk, Compact Isolated High Frequency DC/DC Converters Using Self-Driven Synchronous Rectification. Masters of Science in Electrical Engineering Thesis. Virginia Polytechnic Institute. Dec. 17, 2003; 101 pages.

Wang et al., Design and Implementation of a Digitally-Controlled Phase-Shift Full-Bridge Converter with Output Synchronous Rectifier and Current Doubler. Journal of Technology. 2017; 32(4):283-297.

Zwicker et al., How It Works: The Current Double Demystified. How2Power Today. Feb. 2016; 4 pages.

U.S. Appl. No. 16/286,318, filed Feb. 26, 2019, Zaplana.

* cited by examiner

SYSTEMS AND METHODS FOR TRANSFERRING POWER ACROSS AN ISOLATION BARRIER USING AN ACTIVE RESONATOR

FIELD OF THE DISCLOSURE

The present disclosure relates to galvanic isolation systems and methods.

BACKGROUND

Galvanic isolation between circuit components and transmission of data and power across an isolation barrier is often provided for safety and/or data integrity considerations. In some cases, an isolation barrier may prevent current flow between functional circuit components on opposing sides of the barrier while nonetheless allowing the exchange of energy or information across the barrier via components such as via transformers or capacitors or by optical means. Galvanic isolation is sometimes used to isolate circuits operating in different voltage domains. Galvanic isolation is sometimes used to isolate circuits referenced to different electric potentials.

SUMMARY OF THE DISCLOSURE

Systems and methods for transferring power across an isolation barrier using an active self-synchronized resonator are described. A resonator may use the isolation barrier to resonate with active devices arranged on both sides of the barrier, to provide DC to DC power conversion with high efficiency. Furthermore, by using a microfabricated transformer or microfabricated capacitor as an isolator, the entire resonator may be microfabricated and implemented on chip. The resonator is also bidirectional, allowing power transfer in either direction across the isolation barrier.

In some embodiments, a circuit for transferring power across an isolation barrier is provided, the circuit comprising a first DC output terminal, a second DC output terminal, and a resonating structure comprising an isolation component having a first terminal and a second terminal, a first active device coupled between the first terminal of the isolation component and the first DC output terminal, a second active device coupled between the second terminal of the isolation component and the first DC output terminal, a third active device coupled between the first terminal of the isolation component and the second DC output terminal, a fourth active device coupled between the second terminal of the isolation component and the second DC output terminal, a first inductor coupled between the first and second active devices and the first DC output terminal, and a second inductor coupled between the third and fourth active devices and the second DC output terminal.

According to some embodiments, a method of transferring DC power across an isolation barrier is provided, the method comprising providing a first DC signal across first and second DC input terminals, and producing a second DC signal across first and second DC output terminals, wherein the first and second DC input terminals and the first and second DC output terminals are coupled to a resonating structure comprising an isolation component having a first terminal and a second terminal, a first active device coupled between the first terminal of the isolation component and the first DC output terminal, a second active device coupled between the second terminal of the isolation component and the first DC output terminal, a third active device coupled between the first terminal of the isolation component and the second DC output terminal, a fourth active device coupled between the second terminal of the isolation component and the second DC output terminal, a first inductor coupled between the first and second active devices and the first DC output terminal, and a second inductor coupled between the third and fourth active devices and the second DC output terminal.

According to some embodiments, an isolated DC-DC converter is provided, comprising an isolator having a primary side isolation component and a secondary side isolation component, first and second pairs of cross-coupled active devices arranged in a full-bridge configuration and coupled to the primary side isolation component, third and fourth pairs of cross-coupled active devices arranged in a full-bridge configuration and coupled to the secondary side isolation component.

BRIEF DESCRIPTION OF THE DRAWINGS

Various aspects and embodiments of the application will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Aspects of the present application provide a resonating isolated DC-DC converter. Transmitting DC power through an isolation barrier may comprise converting a DC signal to an AC signal via a DC to AC converter on one side of the barrier, transferring the AC signal across the barrier, and converting an AC signal to a DC signal via an AC to DC converter on the other side of the barrier. The isolator transferring signals across the barrier may be a transformer-based isolator or a capacitor-based isolator.

Conventional isolated DC-DC converters sometimes utilize a driver circuit on the primary side of the isolator to provide DC to AC conversion, and diodes on the secondary side of the isolator to rectify an AC voltage as part of an AC to DC converter. The inventor has recognized and appreciated that the power transfer efficiency of such an approach may be less-than-optimal as a result of power being dissipated through the diodes, and may require a complex driver circuit on the primary side to drive the transformer in the correct manner for power transfer. Moreover, while it may be possible to microfabricate some portions of such a DC-DC converter, there may be portions which cannot be microfabricated. Thus, such an isolator may consume a greater footprint than desired.

The inventor has developed systems and methods for transferring power across an isolation barrier using an active self-synchronized resonating isolator. A resonator as described herein uses the isolation component (e.g., a transformer or capacitor) to resonate with active devices arranged on both sides of the barrier, which provides DC to DC power conversion with high efficiency. The active devices on a given side of the isolation barrier may be arranged in a full bridge configuration. Furthermore, by using a microfabricated transformer or microfabricated capacitor as an isolator, the entire resonator may be microfabricated and implemented on chip in some embodiments, which may provide for a resonator with a smaller area than in conventional approaches. The resonator is also bidirectional as a result of its symmetrical design, which allows for power transfer in either direction across the isolation barrier.

Figure 1:
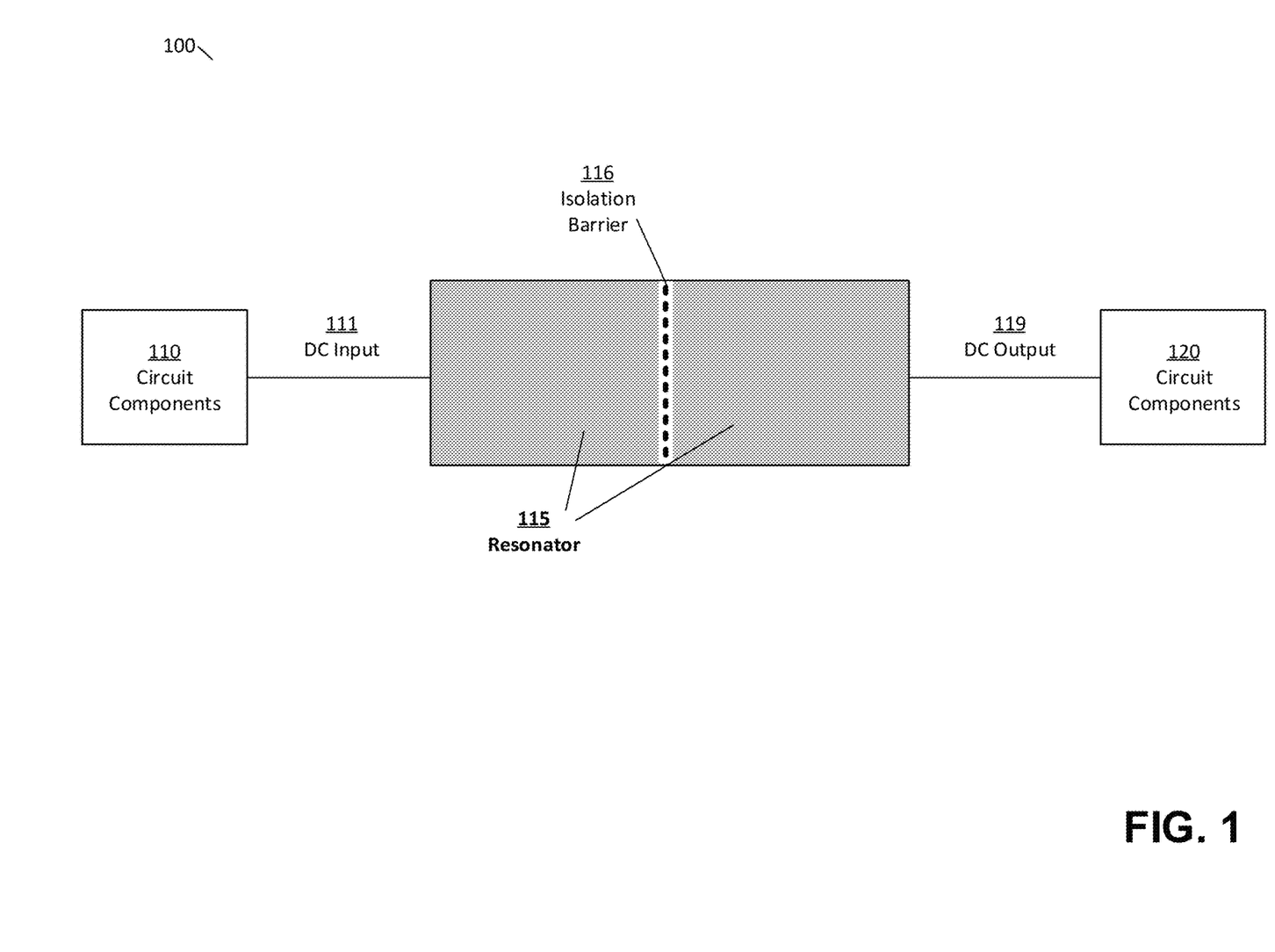
FIG. 1 depicts a block diagram of a resonating isolated DC-DC converter, according to some embodiments.

FIG. 1 depicts an illustrative circuit in which a resonator as described herein may be implemented and used as a DC-DC converter, according to some embodiments. In the example of circuit 100, circuit components 110 are galvanically isolated from circuit components 120 via an isolation barrier 116. The isolation barrier 116 is part of a resonator 115, which is coupled to circuit components 110 via a DC input 111 and to circuit components 120 via a DC output 119. It will be appreciated that, as discussed above, the resonator 115 may be configured to act bidirectionally, and as such the coupling 119 may also be operated as a DC input and the coupling 111 operated as a DC output. Resonator 115 is depicted in two sections in FIG. 1 to illustrate that the isolation barrier is encompassed by the resonator 115.

According to some embodiments, the resonator may include an isolator in the form of a transformer and/or a capacitor, which may include a microfabricated transformer and/or microfabricated capacitor. In some embodiments, resonator 115 (including the isolator and the isolation barrier 116) may be microfabricated on chip; in such cases, any of the circuit components 110 and/or 120 may also be microfabricated with the resonator on the same chip. In some cases, the circuit components 110, the circuit components 120 and the resonator 115 may each be microfabricated on a respective chip. Alternatively, the circuit components 110 and the resonator 115 may be fabricated on the same chip with circuit components 120 being fabricated on a separate chip. Alternatively, the circuit components 120 and the resonator 115 may be fabricated on the same chip with circuit components 110 being fabricated on a separate chip.

According to some embodiments, resonator 115 may be operated at frequencies of 1 MHz or greater, or at frequencies of 10 MHz or greater, or at frequencies of 100 MHz or greater, and may be operated at frequencies of 1 GHz or lower, or at frequencies of 100 MHz or lower, or at frequencies of 10 MHz or lower. For instance, a given resonator 115 may be operable at frequencies between 10 MHz and 100 MHz.

In some embodiments, excess power at the DC output 119 may be provided to the DC input 111 via a feedback circuit.

Figure 2A:
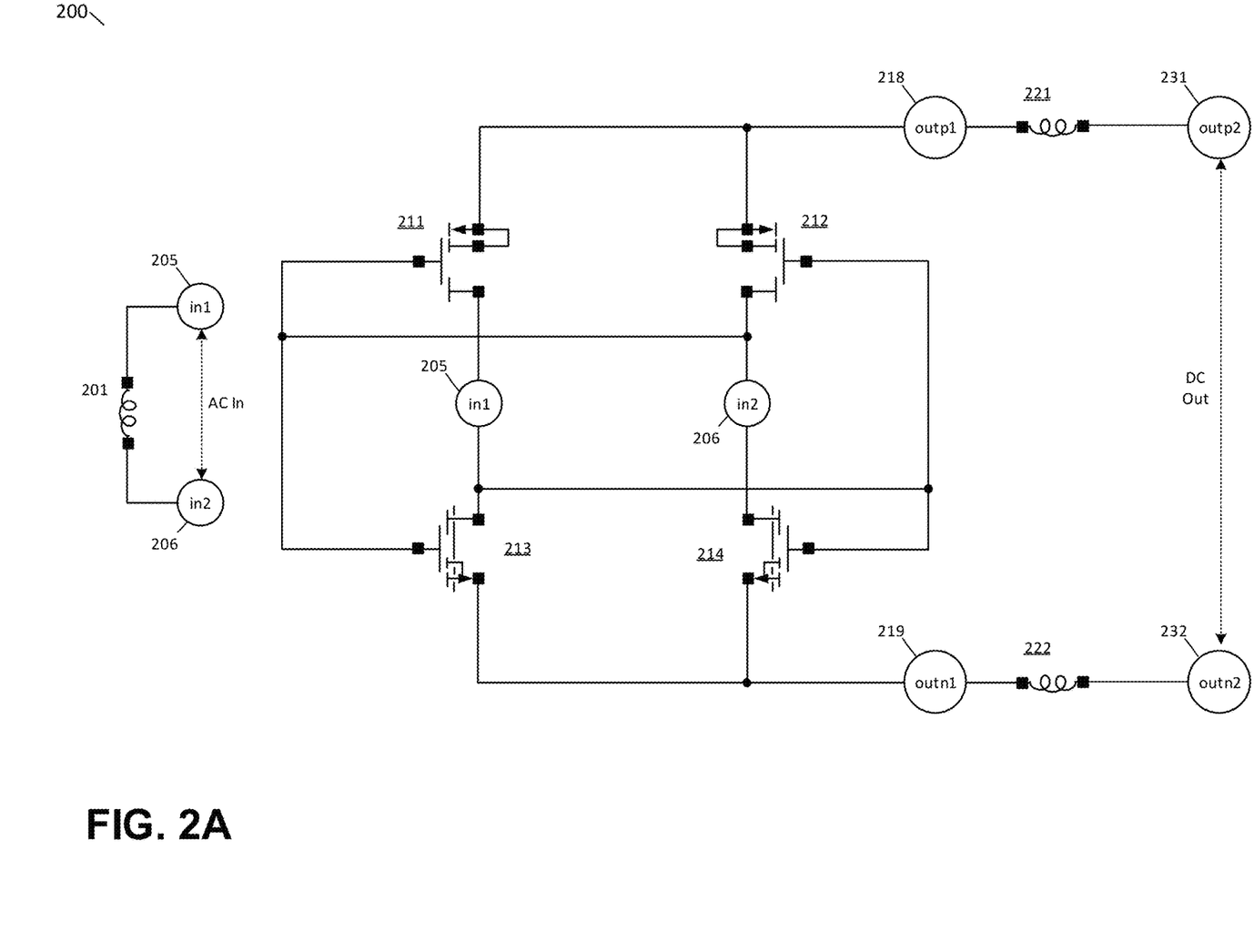
FIG. 2A depicts a portion of a resonating isolated DC-DC converter, according to some embodiments.

FIG. 2A depicts a circuit 200 representing a portion of a resonator, according to some embodiments. The portion of the resonator illustrated may serve to perform AC-DC conversion or vice versa, and may represent part of a resonator representing an isolated resonating DC-DC converter. Since a bidirectional resonator may include two symmetric portions on opposing sides of an isolation barrier, for the purposes of explanation only one side of the resonator is shown in FIG. 2A. The full resonator circuit is shown in FIG. 2C, which is discussed further below.

Figure 2B:
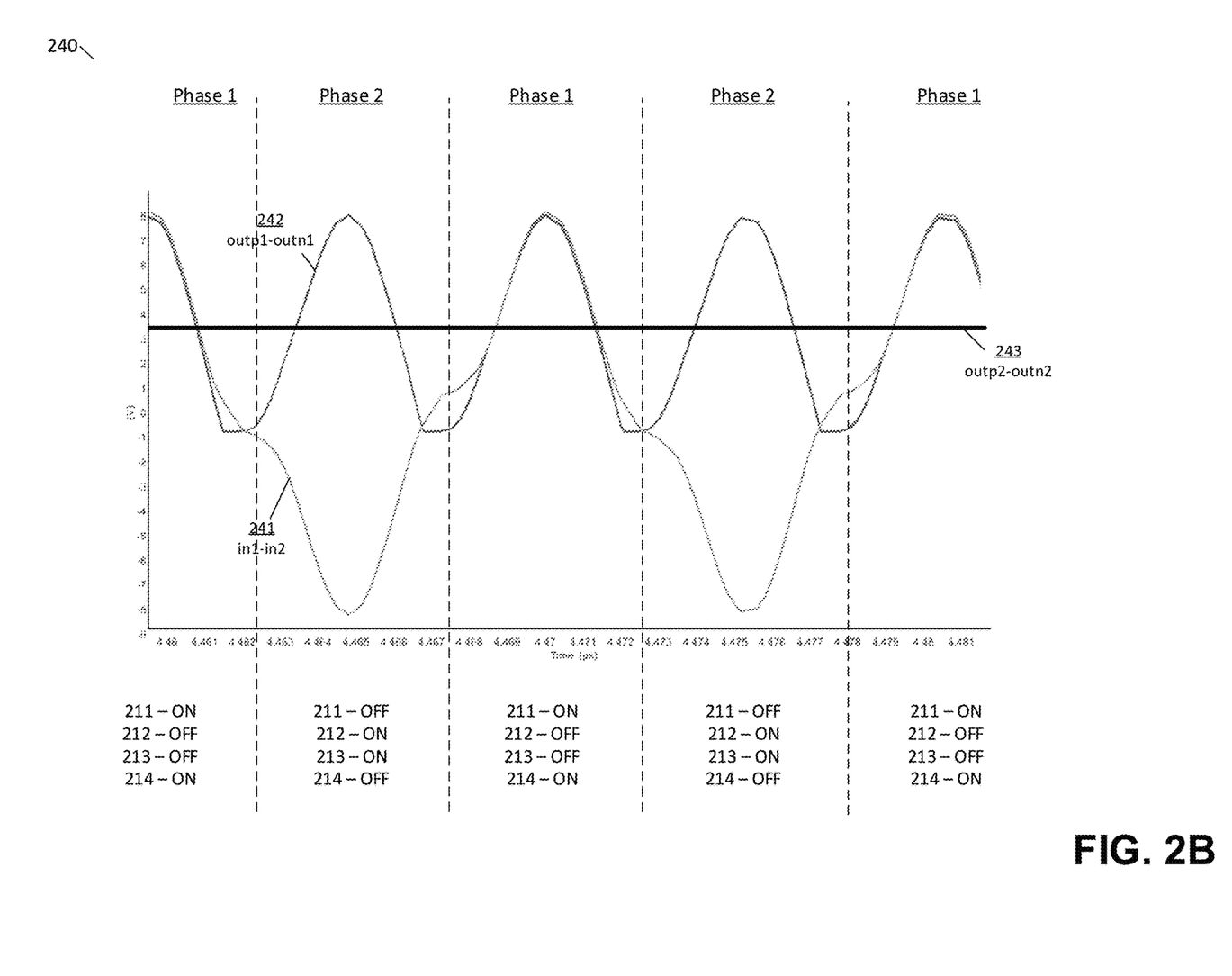
FIG. 2B depicts voltages over time across three different points of the circuit shown in FIG. 2A, according to some embodiments.
Figure 2C:
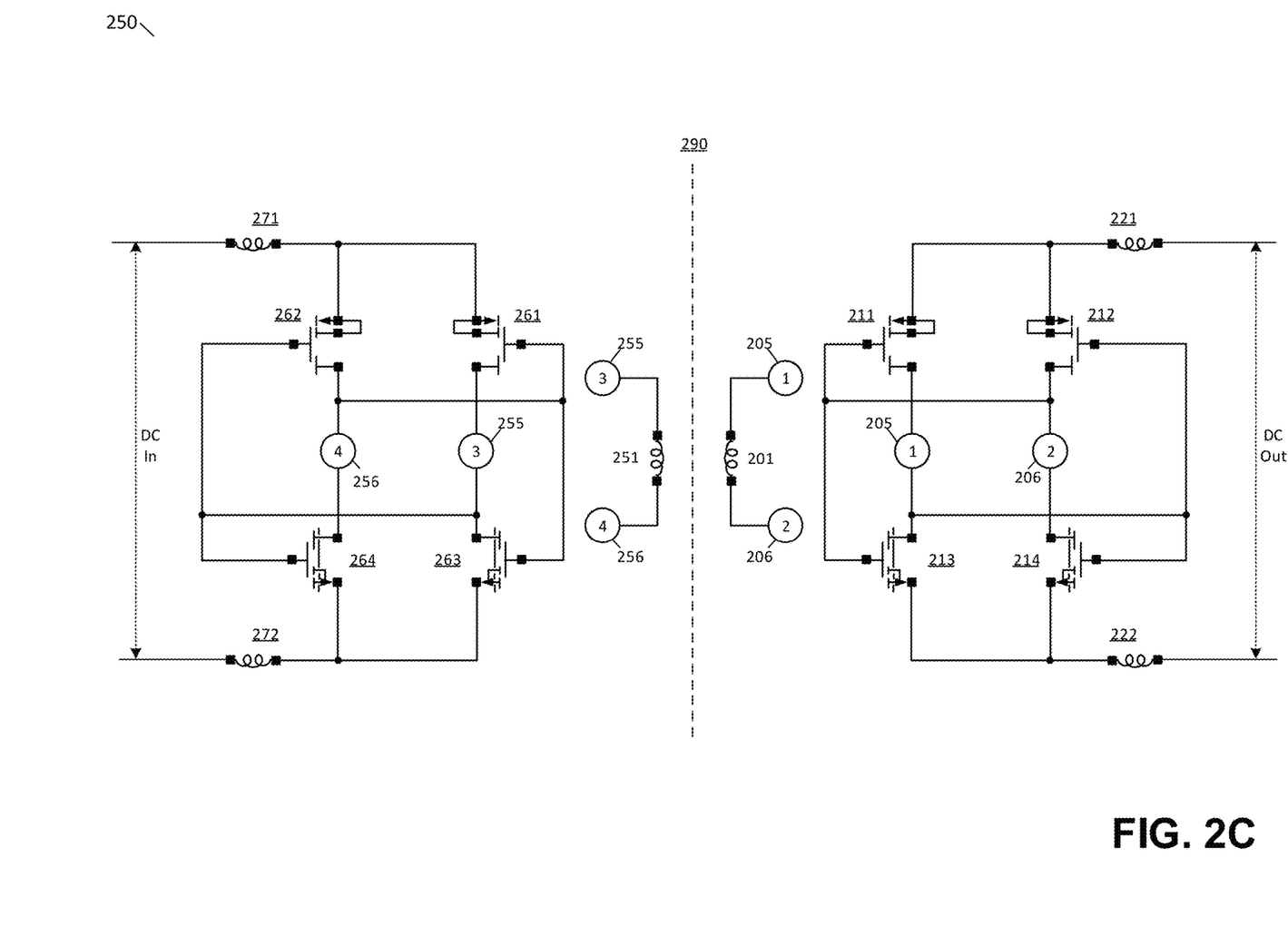
FIG. 2C depicts a circuit diagram of an example resonating isolated DC-DC converter, according to some embodiments.

In circuit 200, an inductor 201 represents one inductor within a transformer, which acts as an isolator in the example of FIGS. 2A-2C. The inductor 201 may therefore be considered a secondary coil, and may produce an AC current across terminals 205 ("in1") and 206 ("in2") in response to an AC current being generated in another inductor on the other side of the isolation barrier (e.g., a primary coil). In circuit 200, the terminals of the isolator 205 and 206 are coupled to active devices 211, 212, 213 and 214.

In the example of FIGS. 2A-2C, the active devices are metal oxide semiconductor field effect transistors (MOSFETs), with FETs 211 and 212 being PMOS transistors and FETs 213 and 214 being NMOS transistors. In the circuit 200, the FETs operate as switches, and the four FETs are arranged in a cross-coupled configuration. Each terminal of the inductor 201 is connected to one of the two gates of each transistor pair (transistors 211 and 212 being one pair and transistors 213 and 214 being another pair). That is, in1 is connected to the gate of transistor 214 and in2 is connected to the gate of transistor 213; similarly, in1 is connected to the gate of transistor 212 and in2 is connected to the gate of transistor 211. This arrangement causes opposing activation and deactivation of the transistors within each pair; as one transistor of the pair is active the other is inactive, and vice versa. The resulting voltage across the points of the circuit 218 ("outp1") and 219 ("outn1") is thereby rectified. This signal still contains oscillations, however, and the inductors 221 and 222 serve to smooth the signal to produce a net DC signal. In particular, inductors 221 and 222 may provide a high impedance to the AC signal, which thereby confines the AC energy within the resonator to achieve a high conversion efficiency.

It should be appreciated that FETs represent a non-limiting example of transistor switch technology, and that other types of transistors may be employed in the same configuration as that shown. Furthermore, it will be appreciated that, in an alternate configuration, the FETs 211 and 212 may be NMOS transistors and the FETs 213 and 214 PMOS transistors.

The aforementioned voltages are depicted in FIG. 2B, which illustrates a voltage over time across three different points of the circuit 200. The signal 241 is an input AC signal across the inductor 201 (i.e., across 205/206); signal 242 is a rectified signal across the points of the circuit 218 ("outp1") and 219 ("outn1"); and signal 243 is a DC signal across the points of the circuit 231 ("outp2") and 232 ("outn2"). Temporal phases in which the transistors are activated and deactivated are shown, with phase 1 being identified as a period in which transistors 211 and 214 are active and transistors 212 and 213 are inactive, and phase 2 being a period in which transistors 212 and 213 are active and transistors 211 and 214 are inactive.

A complete resonator circuit is shown in FIG. 2C, according to some embodiments. The illustrated resonator circuit may operate as a full bridge isolated resonating DC-DC converter in a self-synchronized H-bridge configuration. In operation, either side of the resonator with respect to the isolation barrier 290 may act as a driver on a primary side with the other side acting as a rectifier on a secondary side, depending on the direction in which power transfer is directed.

In FIG. 2C, resonator 250 (which may be an example of resonator 115 shown in FIG. 1) includes two portions on either side of an isolation barrier 290, with each portion being the circuit of FIG. 2A (or a mirror image thereof). In the example of FIG. 2C, elements 251, 255, 256, 261, 262, 263, 264, 271 and 272 are additional instances of corresponding elements 201, 205, 206, 211, 212, 213, 214, 221 and 222, respectively. The circuit 250 may operate as a resonator, causing DC-DC power transfer across the isolation barrier 290. In the example of FIG. 2C, a transformer comprising inductors 201 and 251 acts as an isolator. The four transistors on a given side of the isolation barrier 290 of circuit 250 (e.g., transistors 211, 212, 213 and 214) may be considered to be two pairs of cross-coupled switches (e.g., transistors 211 and 212 being one pair, and transistors 213 and 214 being another pair). As with inductors 221 and 222, the inductors 271 and 272 serve to smooth the signal to produce a net DC signal, yet on the other side of the isolation barrier to inductors 221 and 222.

According to some embodiments, resonator 250 may, in operation, resonate at frequencies of 1 MHz or greater, or at frequencies of 10 MHz or greater, or at frequencies of 100 MHz or greater. With the illustrative voltages of FIG. 2B, for instance, the AC signal 241 is depicted at a frequency of approximately 10 MHz (with a period of approximately 0.01 microseconds). Operation at high frequencies may facilitate microfabrication of the transformer of the isolation barrier, in addition to improving efficiency of the transformer. Furthermore, at high frequencies the inductors 221, 222, 271 and 272 may have a small inductance, which also allows these components to be microfabricated. For instance, the inductors 221, 222, 271 and 272 may each have an inductance of less than 10 nH, or less than 5 nH, or less than 2 nH.

Based on FIG. 2C, it will be appreciated that aspects of the present application provide a single stage resonating DC-DC converter. As discussed above, either side of the circuit 250 with respect to the isolation barrier 290 may act as a primary side or secondary side in operation, depending on a direction of power transfer.

The isolated DC-DC converters described herein may be used in various applications. For example, automotive, consumer electronics, industrial, and healthcare applications may all make use of the technology described herein.

Figure 3:
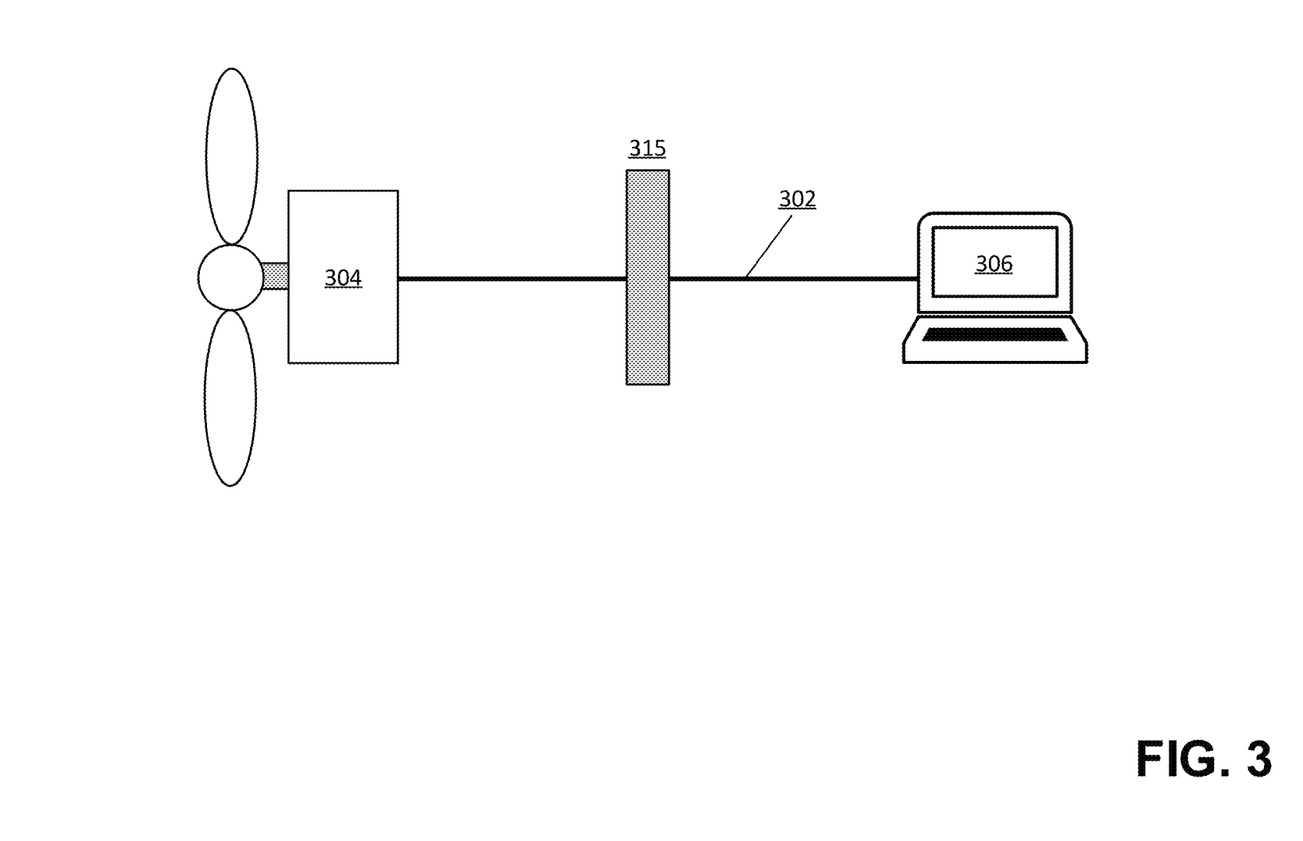
FIG. 3 is a schematic diagram showing an exemplary application of an apparatus in an industrial communication link, according to some embodiments.

FIG. 3 is a schematic diagram showing an exemplary application of an apparatus in an industrial communication link, according to some embodiments. An isolated DC-DC converter 315 may be used in an industrial communication link 302 to isolate a comparatively high voltage device from a comparatively low voltage device. In the example of FIG. 3, the communication link 302 is between a turbine 304 and a computing device 306. The computing device 304 may for instance be a personal computer (PC), a server, a smartphone, a personal digital assistance (PDA), a tablet, or another computing device. Other such devices may also make use of DC-DC converters of the types described herein. Although the DC-DC converter 315 is depicted along the communication link 302 between the turbine 304 and computing device 306, the converter 315 may be in practice arranged in either the turbine or the computing device instead of as a separate component along the communication link 302.

While FIG. 3 illustrates an example of an industrial communication link incorporating aspects of the present application, other uses are possible. For example, one or more isolated DC-DC converter devices may be employed in an automobile (e.g., within a CAN transceiver) or a medical instrument. Various embodiments of the present application may be implemented to provide high compact, cost-effective DC to DC power conversion.

The various aspects described herein may provide various benefits. Some such benefits have been described previously herein. Not all embodiments provide every benefit, and benefits other than those listed may be provided. In some embodiments, an isolated DC-DC converter is provided with a simplified circuit design. The simplified circuit design may save space on a printed circuit board and/or reduce manufacturing costs by using a common isolator to transfer power and feedback signals in opposite directions. Some embodiments may provide improved power efficiency and/or isolating ratings over a conventional isolated DC-DC converter, at least in part due to the techniques described herein allowing for operation of the converter at high frequencies (e.g., >10 MHz). Some embodiments may provide for a simple control structure compared with a conventional isolated DC-DC converter by being self-synchronized, such that a driver circuit may not be necessary to operate the converter. Some embodiments may allow for bi-directional power transfer due to the symmetrical nature of the resonator described herein. In some embodiments, a resonator as described herein may be fabricated using a standard silicon process.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A circuit for transferring power across an isolation barrier, the circuit comprising:
   a first DC output terminal;
   a second DC output terminal; and
   a resonating structure comprising:
      an isolation component having a first terminal and a second terminal;
      a first active device coupled between the first terminal of the isolation component and the first DC output terminal;
      a second active device coupled between the second terminal of the isolation component and the first DC output terminal;
      a third active device coupled between the first terminal of the isolation component and the second DC output terminal;
      a fourth active device coupled between the second terminal of the isolation component and the second DC output terminal;
      a first inductor coupled between the first and second active devices and the first DC output terminal; and
      a second inductor coupled between the third and fourth active devices and the second DC output terminal.

2. The circuit of claim 1, wherein the first and second active devices are MOSFETs, a gate of the first active device is connected to the first terminal of the isolation component, and a gate of the second active device is connected to the second terminal of the isolation component.

3. The circuit of claim 2, wherein the third and fourth active devices are MOSFETs, a gate of the third active device is connected to the first terminal of the isolation component, and a gate of the fourth active device is connected to the second terminal of the isolation component.

4. The circuit of claim 3, wherein the first and second active devices are PMOS transistors, and wherein the third and fourth active devices are NMOS transistors.

5. The circuit of claim 3, wherein:
a source of the first active device is connected to the second terminal of the isolation component,
a source of the second active device is connected to the first terminal of the isolation component,
a source of the third active device is connected to the second terminal of the isolation component, and
a source of the fourth active device is connected to the first terminal of the isolation component.

6. The circuit of claim 1, wherein the isolation component comprises a micro-transformer.

7. The circuit of claim 1, wherein the isolation component comprises a micro-capacitor.

8. The circuit of claim 1, wherein the isolation component has a third terminal and a fourth terminal across the isolation barrier from the first terminal and second terminal, and wherein the circuit further comprises:
a first DC input terminal;
a second DC input terminal;
a fifth active device coupled between the third terminal of the isolation component and the first DC input terminal;
a sixth active device coupled between the fourth terminal of the isolation component and the first DC input terminal;
a seventh active device coupled between the third terminal of the isolation component and the second DC input terminal; and
an eighth active device coupled between the fourth terminal of the isolation component and the second DC input terminal.

9. The circuit of claim 8, further comprising:
a third inductor coupled between the fifth and sixth active devices and the first DC input terminal; and
a fourth inductor coupled between the seventh and eighth active devices and the second DC input terminal.

10. The circuit of claim 1, wherein the resonating structure is fabricated on chip.

11. The circuit of claim 1, wherein the first and second inductors each have an inductance between 1 nH and 10 nH.

12. The circuit of claim 1, wherein, in a first state, an AC voltage applied across the first terminal and second terminal of the isolation component activates the first active device and the fourth active device, and wherein, in a second state, the AC voltage applied across the first terminal and second terminal of the isolation component activates the second active device and the third active device.

13. A method of transferring DC power across an isolation barrier, the method comprising:
providing a first DC signal across first and second DC input terminals; and
producing a second DC signal across first and second DC output terminals,
wherein the first and second DC input terminals and the first and second DC output terminals are coupled to a resonating structure comprising:
an isolation component having a first terminal and a second terminal;
a first active device coupled between the first terminal of the isolation component and the first DC output terminal;
a second active device coupled between the second terminal of the isolation component and the first DC output terminal;
a third active device coupled between the first terminal of the isolation component and the second DC output terminal;
a fourth active device coupled between the second terminal of the isolation component and the second DC output terminal;
a first inductor coupled between the first and second active devices and the first DC output terminal; and
a second inductor coupled between the third and fourth active devices and the second DC output terminal.

14. The method of claim 13, wherein the first and second active devices are MOSFETs, a gate of the first active device is connected to the first terminal of the isolation component, and a gate of the second active device is connected to the second terminal of the isolation component.

15. The method of claim 14, wherein the third and fourth active devices are MOSFETs, a gate of the third active device is connected to the first terminal of the isolation component, and a gate of the fourth active device is connected to the second terminal of the isolation component.

16. The method of claim 15, wherein the first and second active devices are PMOS transistors, and wherein the third and fourth active devices are NMOS transistors.

17. An isolated DC-DC converter, comprising:
an isolator having a primary side isolation component and a secondary side isolation component;
first and second pairs of cross-coupled active devices arranged in a full-bridge configuration and coupled to the primary side isolation component;
third and fourth pairs of cross-coupled active devices arranged in a full-bridge configuration and coupled to the secondary side isolation component.

18. The isolated DC-DC converter of claim 17, wherein the isolated DC-DC converter is microfabricated on chip.

19. The isolated DC-DC converter of claim 17, wherein the isolator comprises a micro-transformer.

20. The isolated DC-DC converter of claim 17, further comprising a first inductor coupled between the first and second pairs of cross-coupled active devices and a first output terminal of the isolated DC-DC converter, and a second inductor coupled between the first and second pairs of cross-coupled active devices and a second output terminal of the isolated DC-DC converter.

* * * * *